(12) United States Patent
Yasuda et al.

(10) Patent No.: US 7,535,609 B2
(45) Date of Patent: May 19, 2009

(54) HOLOGRAM RECORDING METHOD AND DEVICE

(75) Inventors: Shin Yasuda, Ashigarakami-gun (JP); Katsunori Kawano, Ashigarakami-gun (JP); Koichi Haga, Ashigarakami-gun (JP); Jiro Minabe, Ashigarakami-gun (JP); Makoto Furuki, Ashigarakami-gun (JP); Yasuhiro Ogasawara, Ashigarakami-gun (JP); Kazuhiro Hayashi, Ashigarakami-gun (JP); Hisae Yoshizawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 247 days.

(21) Appl. No.: 11/339,700

(22) Filed: Jan. 26, 2006

(65) Prior Publication Data

US 2007/0041066 A1 Feb. 22, 2007

(30) Foreign Application Priority Data

Aug. 19, 2005 (JP) .............................. 2005-238823

(51) Int. Cl.
*G03H 1/16* (2006.01)
*G03H 1/26* (2006.01)
*G11B 7/00* (2006.01)

(52) U.S. Cl. .............................. 359/29; 359/22; 369/103
(58) Field of Classification Search .................... 359/22, 359/24, 25, 29; 369/103
See application file for complete search history.

(56) References Cited

U.S. PATENT DOCUMENTS

| 5,440,669 | A | * | 8/1995 | Rakuljic et al. | ................. | 359/7 |
| 6,023,355 | A | * | 2/2000 | Bashaw et al. | ................. | 359/21 |
| 6,108,110 | A | * | 8/2000 | Orlov et al. | ................... | 359/22 |
| 2004/0062178 | A1 | * | 4/2004 | Horimai | ..................... | 369/103 |

FOREIGN PATENT DOCUMENTS

JP 3452113 B2 7/2003

OTHER PUBLICATIONS

Kazuhiko Kimura, "Improvement of the optical signal-to-noise ration in common-path holographic storage by use of a polarization-controlling media structure," *Optics Letter*, vol. 30, No. 8, Apr. 15, 2005, pp. 878-880.

* cited by examiner

*Primary Examiner*—Alessandro Amari
(74) *Attorney, Agent, or Firm*—Oliff & Berridge, PLC

(57) ABSTRACT

A hologram recording method comprising recording information of signal light as a reflection-type hologram on an optical recording medium, by illuminating the signal light and reference light on a same axis and from different sides of the optical recording medium is provided. Further, a hologram recording device including: a signal light illuminating section illuminating signal light onto an optical recording medium; and a reference light illuminating section illuminating reference light of a same axis as the signal light, onto the optical recording medium from a different side than the signal light is provided.

21 Claims, 11 Drawing Sheets

HOLOGRAM RECORDING METHOD AND DEVICE

CROSS-REFERENCE TO RELATED APPLICATION

This application claims priority under 35 USC 119 from Japanese Patent Application No. 2005-238823, the disclosure of which is incorporated by reference herein.

BACKGROUND OF THE INVENTION

1. Field of the Invention

The present invention relates to a hologram recording method and device, and in particular, to a hologram recording method and device which record a reflection-type hologram by illuminating signal light and reference light on the same axis.

2. Description of the Related Art

A method of fabricating a transmission-type hologram by illuminating signal light and reference light on the same axis from the same surface side of a recording medium has been proposed (see Japanese Patent No. 3452113). In this method, reference light and signal light generated from spatially different positions of a spatial light modulator are Fourier transformed by a lens. Because the Fourier transformed signal light and reference light are superposed in a vicinity of the Fourier transform plane, by placing the recording medium at this position, a hologram can be recorded. Further, in this method, because the signal light and the reference light are illuminated on the same axis, the optical system is simple, and the recording device can be made to be compact.

However, the further away, in the direction of the optical axis, from the Fourier transform plane, the smaller the region at which the signal light and the reference light are superposed. Accordingly, in same-axis recording of a transmission-type hologram, there is the major problem that, if the film thickness of the recording material is large, a hologram cannot be recorded in the entire optical axis direction (direction of thickness) of the recording medium.

In a volume hologram in which interference fringes are recorded three-dimensionally by utilizing the direction of thickness of the recording medium, the greater the thickness of the material, the stricter the Bragg condition, and the larger the dynamic range can be made. Further, the stricter the Bragg condition and the larger the dynamic range, the greater the number of holograms that can be multiple-recorded. Accordingly, the greater the thickness of the material, the greater the number of holograms that can be multiple-recorded.

Moreover, in order to make the recording density large, the recording region must be made to be small. In order to make the recording region small, it is desirable to make the focal length of the Fourier transform lens short. However, it is difficult to both make the thickness of the recording medium thick and make the focal length of the Fourier transform lens short. The reason for this is as follows: the recording medium exists at a position which is separated, in the optical axis direction, from the Fourier transform plane, and the shorter the focal length of the Fourier transform lens, the smaller the region at which the signal light and the reference light are superposed, even at a position which is slightly away from the Fourier transform plane in the optical axis direction. Therefore, the recording of a hologram is difficult at this position.

In order to realize a high recording density in this way, a thick recording material and a Fourier transform lens having a short focal length are needed. However, in same-axis recording of a transmission-type hologram, it is difficult to both make the thickness of the recording medium thick and make the focal length of the Fourier transform lens short, and therefore, it is difficult to realize high density recording.

Further, the aforementioned prior art proposes providing a reflective layer at the reverse surface of the recording medium. However, in this case, the quality of the signal light and the reference light is affected greatly by the quality of the reflective layer, and the problem arises that the quality of the signal light and the reference light deteriorates due to defects of the reflective layer or the like. Moreover, there is the problem that, in the reconstructing of data as well, it is easy for the SN ratio of the reconstruction light to deteriorate. The reason for this is that, because the reading light and the reconstruction light exit in the same direction on the same axis, scattering light of the reading light is incident on a detector together with the reconstruction light.

As a method of reducing this scattering light, Optics Letters Vol. 30 p 878-880 (2005) proposes sandwiching a recording material by quarter-wave plates. In this method, a reflection-type hologram is recorded by incident light of signal light and reflected light from the reflective layer of the reference light, and reflected light from the reflective layer of the signal light and incident light of the reference light. At the time of reconstructing, because the reconstruction light and the reading light are linearly polarized lights whose planes of polarization are orthogonal, the scattering light can be reduced by using an analyzer.

However, in this method, because quarter-wave plates are used at the recording medium, there are the problems that the recording medium is expensive and the production thereof also is complex. Moreover, when this recording medium is rotated around the optical axis, the optical axes of the quarter-wave plates become offset, and therefore, there is the problem that the recording medium cannot be used as a rotating-type medium such as a DVD.

SUMMARY OF THE INVENTION

The present invention has been made in view of the above circumstances and provides a hologram recording method and device which can record a reflection-type hologram by illuminating signal light and reference light on the same axis, and which enable high density recording at a volume hologram. Further, the present invention provides a hologram recording method and device in which an optical system can be simplified and a recording device can be made compact.

A first aspect of the present invention is a hologram recording method including: recording information of signal light as a reflection-type hologram on an optical recording medium, by illuminating the signal light and reference light on a same axis and from different sides of the optical recording medium.

Further, a second aspect of the present invention is a hologram recording device including: a signal light illuminating section illuminating signal light onto an optical recording medium; and a reference light illuminating section illuminating reference light of a same axis as the signal light, onto the optical recording medium from a different side than the signal light.

In order to illuminate the signal light and the reference light on the same axis and from different sides of the optical recording medium, it is particularly preferable to modulate the reference light, which has been transmitted through the optical recording medium, and generate the signal light. For example, the reference light, which has been transmitted through the optical recording medium, can be modulated by a reflection-type spatial light modulator so as to generate the signal light, the generated signal light can be reflected at the optical recording medium side, and the signal light and the reference light can be illuminated on the same axis from different sides of the optical recording medium.

As described above, the present invention has the effects that a reflection-type hologram can be recorded by illuminating signal light and reference light on a same axis, and high-density recording at a volume hologram is possible.

BRIEF DESCRIPTION OF THE DRAWINGS

Preferred embodiments of the present invention will be described in detail based on the following figures, wherein.

DETAILED DESCRIPTION OF THE INVENTION

Examples of embodiments of the present invention will be described in detail hereinafter with reference to the drawings.

First Embodiment

Figure 1:
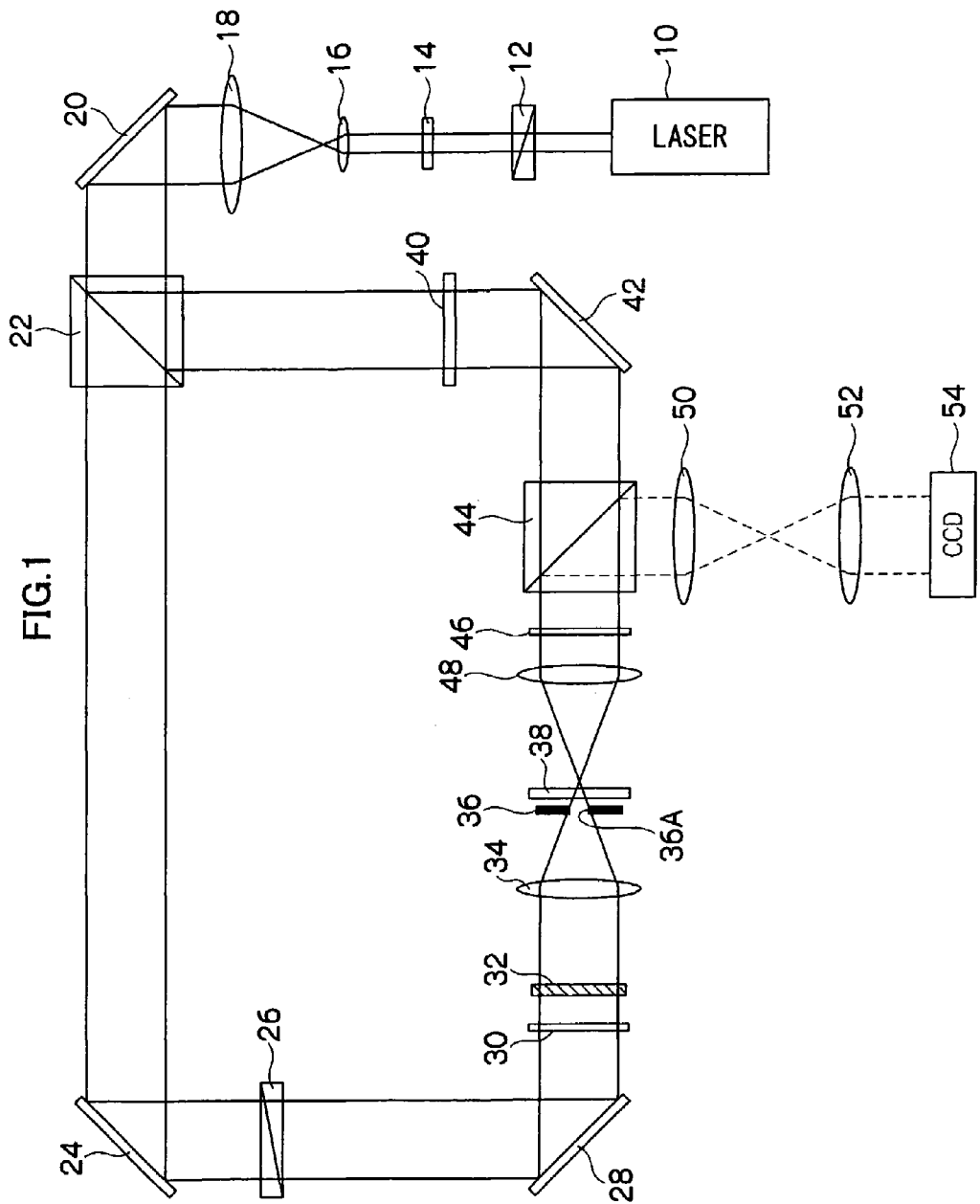
FIG. 1 is schematic structural diagram of a hologram recording/reconstructing device relating to a first embodiment of the present invention.

FIG. 1 is a schematic structural diagram of a hologram recording/reconstructing device relating to a first embodiment of the present invention. As shown in FIG. 1, a laser oscillator 10 using, for example, an Nd:YVO$_4$ crystal, is provided at the hologram recording/reconstructing device. Laser light which is coherent light of, for example, a wavelength of 532 nm, is oscillated and illuminated from the laser oscillator 10.

A shutter 12, which is for blocking laser light, is disposed at the laser light illuminating side of the laser oscillator 10, so as to be able to withdraw from the optical path. A half-wave plate 14 which rotates the plane of polarization and adjusts the intensity ratio of signal light and reference light, a pair of enlarging lenses 16, 18 which collimate laser light into a beam of a large diameter, a polarization beam splitter 22 which, by transmitting P-polarized light and reflecting S-polarized light, separates the laser light into two types of light which are light for reference light and light for signal light, and a reflecting mirror 20 which reflects the laser light and changes the optical path to the direction of the polarization beam splitter 22, are disposed at the light transmitting side of the shutter 12.

Reflecting mirrors 24, 28, which reflect the P-polarized light, which is transmitted through the polarization beam splitter 22, and change the optical path to the direction of a hologram recording medium 38, are provided at the light transmitting side of the polarization beam splitter 22. A shutter 26, which is for blocking the laser light for signal light, is disposed between the reflecting mirror 24 and the reflecting mirror 28, so as to be able to withdraw from the optical path.

A half-wave plate 30 which rotates the plane of polarization of the reflected P-polarized light and adjusts the contrast of the signal light, a transmission-type spatial light modulator 32 which is structured by a liquid crystal display element or the like and which modulates the laser light for signal light in accordance with a supplied recording signal of each page and which generates the signal light (P-polarized light) for recording each page of the hologram, and a lens 34 which collects the laser light for signal light, are disposed in that order at the light reflecting side of the reflecting mirror 28. The lens 34 illuminates the P-polarized light as signal light onto the hologram recording medium 38. The optical axis of the half-wave plate 30 is adjusted so that, for example, the contrast of the signal light transmitted through the spatial light modulator 32 becomes a maximum.

A light-shielding plate 36, in which an aperture 36A is formed, is disposed next to the hologram recording medium 38 at the signal light incident side of the hologram recording medium 38. The signal light collected at the lens 34 passes through the aperture 36A formed in the light-shielding plate 36 and is illuminated onto the hologram recording medium 38.

A half-wave plate 40 which rotates by 90° the plane of polarization of the S-polarized light reflected at the polarization beam splitter 22, a reflecting mirror 42 which reflects the P-polarized light and changes the optical path to the direction of the hologram recording medium 38, and a polarization beam splitter 44 which transmits the reflected laser light (P-polarized light), are disposed at the light reflecting side of the polarization beam splitter 22.

A quarter-wave plate 46, which converts linearly polarized light into circularly polarized light or circularly polarized light into linearly polarized light, is disposed at the light transmitting side of the polarization beam splitter 44, so as to be able to withdraw from the optical path. The quarter-wave plate 46 is withdrawn from the optical path during recording, and is inserted on the optical path during reconstructing. A lens 48, which collects laser light for reference light and generates reference light which is formed from a spherical reference wave, is disposed at the light transmitting side of the quarter-wave plate 46. The lens 48 illuminates P-polarized light as reference light onto the hologram recording medium 38. The signal light and the reference light are thereby illuminated simultaneously onto the hologram recording medium 38. At this time, the reference light is collected such that the optical axis thereof is coaxial with the optical axis of the signal light, and the reference light is illuminated onto the hologram recording medium 38 from a different side than the signal light.

Lenses 50, 52, and a detector 54, which is structured by an image pickup element such as a CCD or the like and which converts received reconstruction light into an electric signal and outputs the electric signal, are disposed at the light reflecting side of the polarization beam splitter 44 at the reconstruction light reconstructed from the recording medium 38. The detector 54 is connected to a personal computer (not shown). The personal computer is connected to the spatial light modulator 32 via a pattern generator which generates a pattern in accordance with a recording signal supplied at a predetermined timing. Further, a driving device (not shown) is connected to the personal computer. The driving device drives the shutters 12, 26 and the quarter-wave plate 46 so as to respectively insert them individually into the optical path, and causes the shutters 12, 26 and the quarter-wave plate 46, which have been inserted in the optical path, to be individually withdrawn from the optical path.

Figure 2:
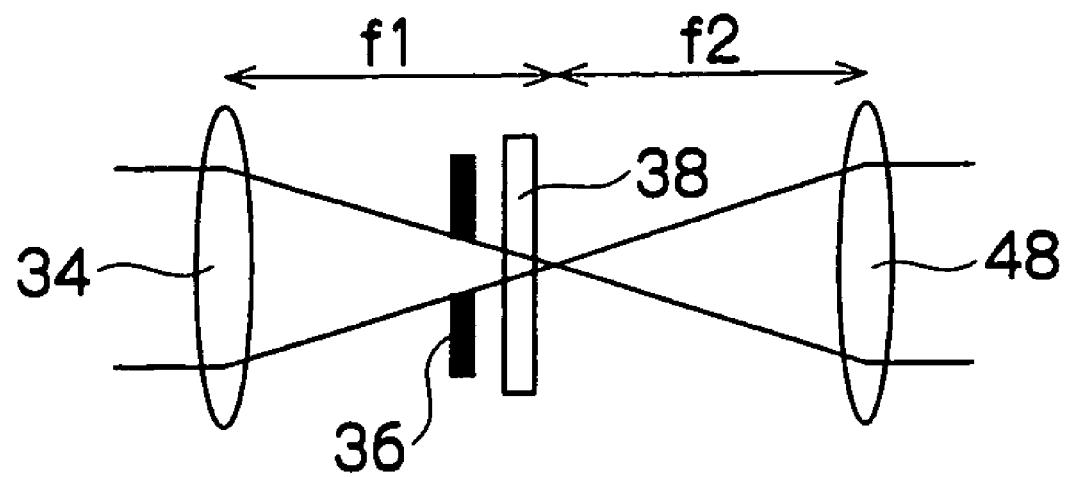
FIG. 2 is a diagram showing the relationship between focal point positions of lenses and a position of a hologram recording medium.

FIG. 2 is a drawing showing the relationship between the focal point positions of the lenses and the position of the hologram recording medium. As shown in FIG. 2, given that the focal length of the lens 34 is $f_1$ and the focal length of the lens 48 is $f_2$, the distance between the lens 34 and the lens 48 is the sum of their focal lengths, i.e., $f_1+f_2$. At this time, it is preferable that the hologram recording medium 38 be disposed at a position which is offset along the optical axis direction from the Fourier transform plane (hereinafter called "FT plane"), i.e., the common focal point position of the two lenses. If the hologram recording medium 38 is disposed at the FT plane, the signal light and the reference light can only be superposed at the focal point, and therefore, the necessary information of the signal light cannot be recorded. In contrast, if the hologram recording medium 38 is offset from the FT plane, the superposition of the signal light and the reference light becomes large, and the information of the signal light can be recorded without drop-out.

The hologram recording processing will be described next. First, the driving device (not shown) is driven, and the shutters 12, 26 and the quarter-wave plate 46 are respectively withdrawn from the optical path such that the laser light can pass through. Next, laser light is illuminated from the laser oscillator 10, a recording signal for each page is supplied from the personal computer (not shown) to the spatial light modulator 32 at a predetermined timing, and hologram recording processing onto the hologram recording medium 38 is carried out.

Namely, the plane of polarization of the laser light exiting from the laser oscillator 10 is rotated by the half-wave plate 14, and the laser light is collimated into a large-diameter beam at the enlarging lenses 16, 18 and is incident on the reflecting mirror 20. The laser light reflected at the reflecting mirror 20 is incident on the polarization beam splitter 22. The laser light is separated by the polarization beam splitter 22 into two types of light which are light (S-polarized light) for reference light and light (P-polarized light) for signal light.

The P-polarized light which is transmitted through the polarization beam splitter 22 is reflected at the reflecting mirrors 24, 28, the plane of polarization thereof is rotated at the half-wave plate 30, and the light is modulated at the spatial light modulator 32 in accordance with the recording signal such that signal light is generated. The generated signal light of P-polarized light is collected at the lens 34, passes through the aperture 36A formed in the light-shielding plate 36, and is illuminated onto the hologram recording medium 38. In order to achieve both a high recording density and a high SN ratio of the reconstructed image, given that the focal length of the lens 34 is $f_1$, the focal length of the lens 48 is $f_2$, the pixel interval of the spatial light modulator 32 is $p_1$, and the wavelength of the laser light is $\lambda$, the configuration of the aperture 36A is made to be square, and the length of one side thereof is preferably in a range of $1\lambda f_1/p_1$ to $2.5\lambda f_1/p_1$, and is more preferably in a range of $1\lambda f_1/p_1$ to $1.5\lambda f_1/p_1$. The central position of the aperture 36A coincides with the optical axis.

On the other hand, the plane of polarization of the S-polarized light, which is reflected at the polarization beam splitter 22, is rotated by 90° at the half-wave plate 40, and the light is reflected at the reflecting mirror 42 and incident on the polarization beam splitter 44. The P-polarized light which is transmitted through the polarization beam splitter 44 is collected at the lens 48, and reference light which is formed from a spherical reference wave is generated. The generated reference light of P-polarized light is illuminated onto the hologram recording medium 38 on the same axis as and from a different side than the signal light.

In this way, the signal light and the reference light are simultaneously illuminated onto the hologram recording medium 38. Changes in the refractive index or the absorption thereby arise due to the interference between the signal light and the reference light at the places where the lights strengthen one another, whereas there is little of such changes at the places where the lights weaken one another. Hologram recording of each page is carried out by this phenomenon. Here, due to the signal light and the reference light being illuminated from different sides of the hologram recording medium 38, a reflection-type hologram, at which high density recording in the thickness direction is possible, is recorded in the hologram recording medium 38.

The hologram reconstructing processing will be described next. First, the driving device (not shown) is driven, and the shutter 26 and the quarter-wave plate 46 are respectively inserted onto the optical path. The laser light transmitted through the polarization beam splitter 22 is thereby cut-off at the shutter 26, and therefore, only the reference light is illuminated onto the hologram recording medium 38 in which a hologram is recorded. Further, the P-polarized light which is transmitted through the polarization beam splitter 44 is converted into circularly polarized light at the quarter-wave plate 46, is collected at the lens 48, and is illuminated onto the hologram recording medium 38.

The reconstruction light which is diffracted at the hologram recording medium 38 becomes reverse-direction circularly polarized light, and exits at the lens 48 side. The reverse-direction circularly polarized light is transmitted through the lens 48, is converted into linearly polarized light (S-polarized light) at the quarter-wave plate 46, and is incident on the polarization beam splitter 44. Only the S-polarized light which is the reconstruction light is selectively reflected at the polarization beam splitter 44, and is received at the detector 54 via the lenses 50, 52. The reconstruction light received at the detector 54 is converted into an electric signal and inputted to the personal computer (not shown), and is displayed on a display (not shown) provided at the personal computer. In this way, the hologram image of each page is reconstructed.

As described above, in the first embodiment, because the signal light and the reference light are illuminated onto the hologram recording medium on the same axis and from opposite directions, a reflection-type hologram can be recorded. In this reflection-type hologram, even if the hologram recording medium is disposed at a position which is offset in the optical axis direction from the Fourier transform plane, it is possible to make the superposition of the signal light and the reference light large, the hologram can be multiple-recorded by utilizing the direction of thickness of the recording medium, and high density recording can be achieved.

Further, the recording/reconstructing of a reflection-type hologram has advantages such as: (1) there is no need to provide a reflective layer at the hologram recording medium, and deterioration of the signal light and the reference light can be prevented; (2) because the propagating directions of the reference light and the reconstruction light illuminated at the time of reconstructing are mutually opposite directions, deterioration of the reconstruction light can be prevented even if a quarter-wave plate is not used at the recording medium, which is different than the method disclosed in Optics Letters Vol. 30 p 878-880 (2005); (3) recording using a rotating-type medium is possible without the need to use a quarter-wave plate at the recording medium; and the like.

Note that, in the above description, explanation is given of an example in which the focal point positions of the two lenses are made to coincide with one another, and the hologram recording medium is disposed at a position which is offset in the optical axis direction from the focal point positions (the FT plane). However, the focal point positions of the two lenses may be made to be different.

Figure 3:
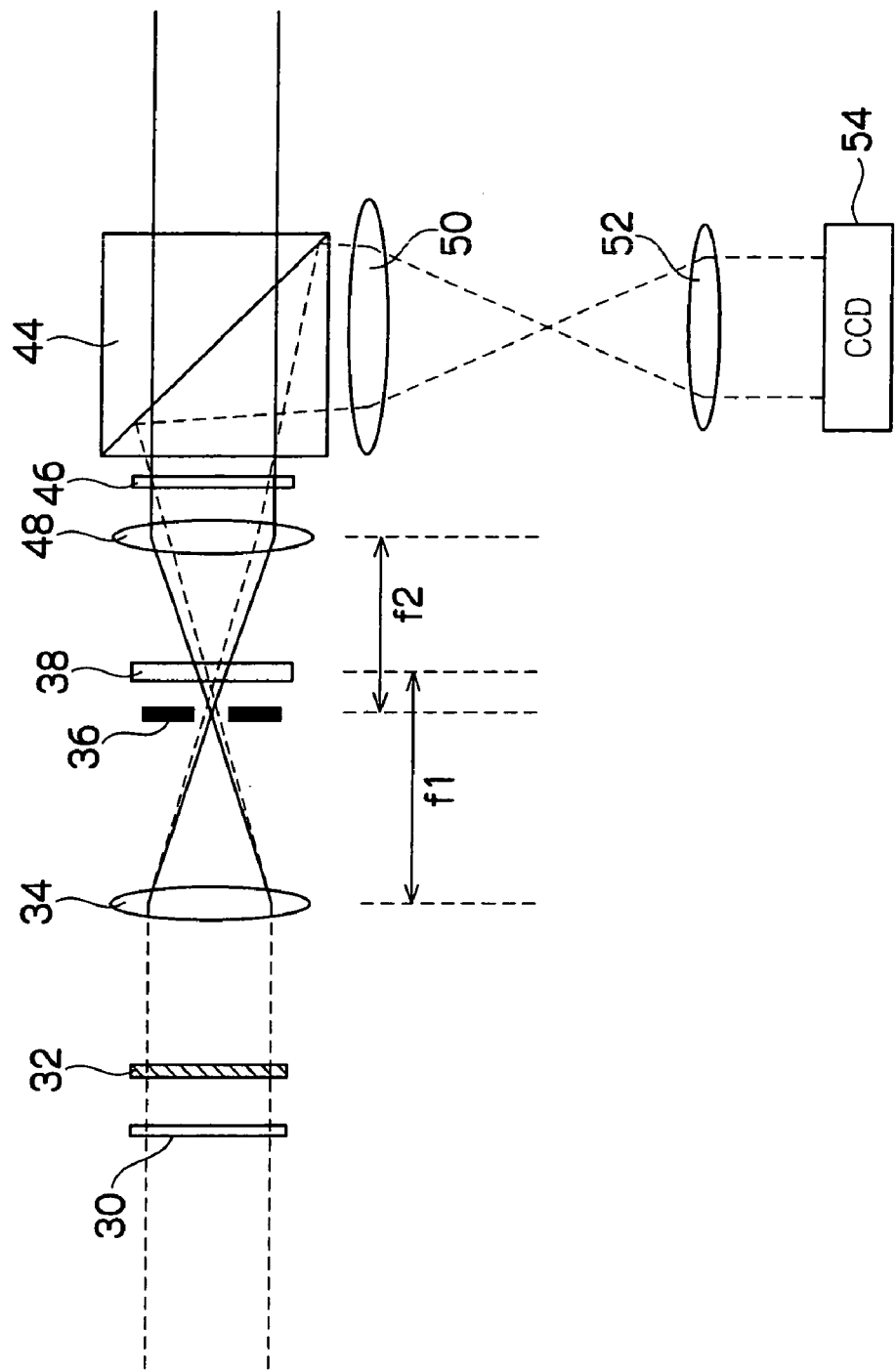
FIG. 3 is a diagram showing the relationship between focal lengths of lenses and a distance between the lenses.

As shown in FIG. 3, given that the focal length of the lens 34 is $f_1$ and the focal length of the lens 48 is $f_2$, in a case in which the distance between the lens 34 and the lens 48 is smaller than the sum $(f_1+f_2)$ of their focal lengths, the collecting plane of the signal light and the collecting plane of the reference light are different. At this time, in the collecting plane of the signal light, the signal light (shown by the dashed line) and the reference light (shown by the solid line) are superposed over a wide region. Accordingly, the hologram recording medium 38 is disposed at the collecting plane of the signal light, and recording of a hologram can be carried out.

At the collecting plane, the signal light is collected at the smallest region, and therefore, the recording region can be made to be small. As a result, a high recording density can be achieved. Moreover, because the signal light and the reference light are superposed over a wide region in the optical axis direction, even if a thick medium is used, the hologram can be recorded over a wide region in the direction of the film thickness (the optical axis direction). Therefore, the Bragg condition becomes stricter, and even higher recording density can be achieved.

However, when the hologram recording medium is disposed at the collecting plane of the signal light, there are cases in which the dynamic range of the recording medium suffers a loss due to the high-intensity zeroth-order light. In such a case, it is preferable to place the recording medium at a position which does not include the two collecting planes of the signal light and the reference light.

Note that, even in cases in which the distance between the lens 34 and the lens 48 is greater than the sum $(f_1+f_2)$ of the respective focal lengths, the signal light and the reference light are superposed over a wide region, at the collecting plane of the signal light, and therefore, effects which are similar to those described above can be achieved. Further, because the distance between the lens 34 and the lens 48 is not equal to the sum $(f_1+f_2)$ of the respective focal lengths, as shown by the dashed line, the reconstruction light from the hologram recording medium 38 is not collimated at the lens 48, but can be made into collimated light by the lenses 50, 52 which are disposed at the light incident side of the detector 54.

Second Embodiment

Figure 4:
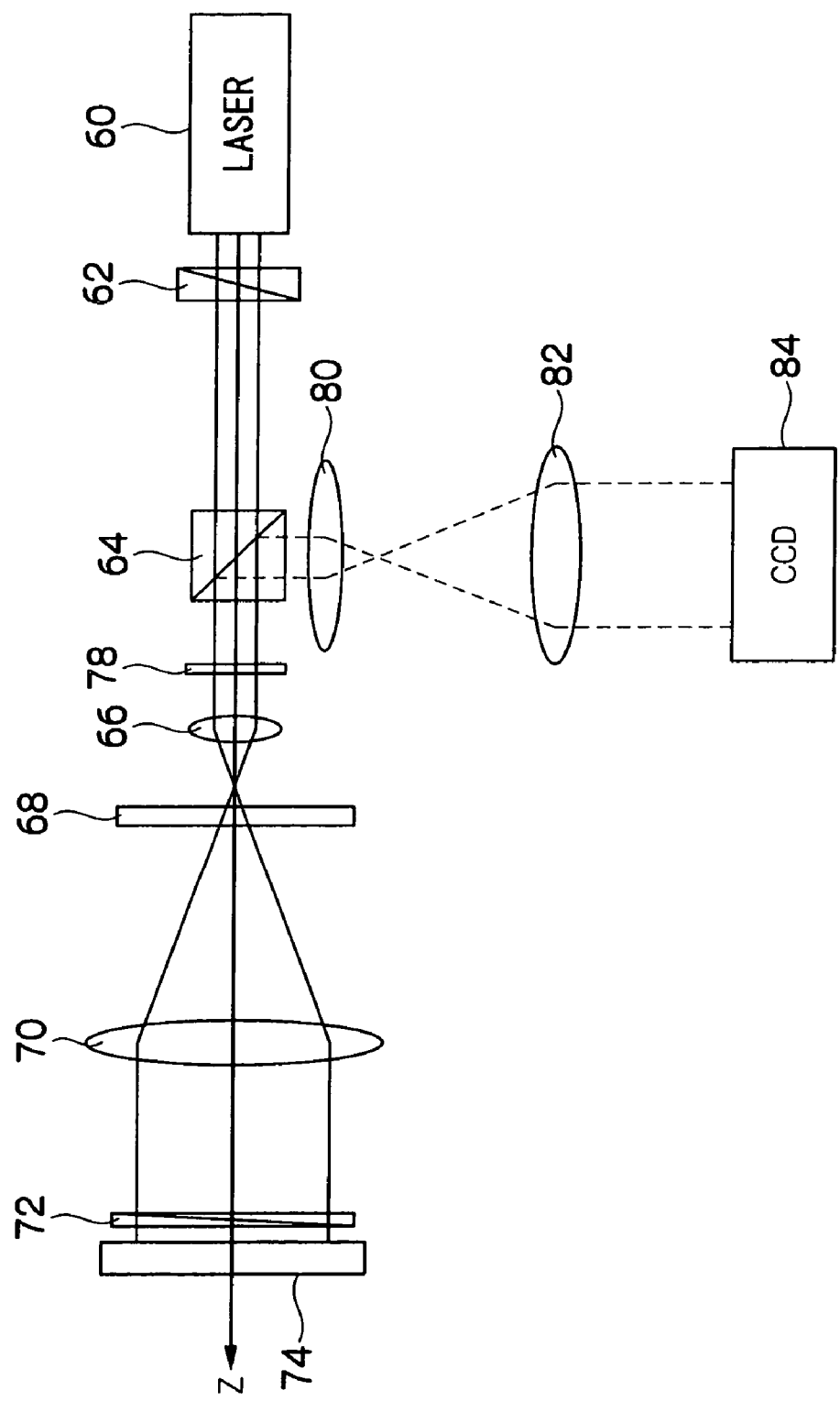
FIG. 4 is a schematic structural diagram of a hologram recording/reconstructing device relating to a second embodiment of the present invention.

FIG. 4 is a schematic structural diagram of a hologram recording/reconstructing device relating to a second embodiment of the present invention. As shown in FIG. 4, a laser oscillator 60 is provided at the hologram recording/reconstructing device. Laser light (P-polarized light) is oscillated and illuminated from the laser oscillator 60. A shutter 62, which is for blocking laser light, is disposed at the laser light illuminating side of the laser oscillator 60, so as to be able to withdraw from the optical path. A polarization beam splitter 64, which transmits P-polarized light and reflects S-polarized light, is disposed at the light transmitting side of the shutter 62.

A quarter-wave plate 78, which converts linearly polarized light into circularly polarized light or circularly polarized light into linearly polarized light, is disposed at the light transmitting side of the polarization beam splitter 64 so as to be able to withdraw from the optical path. A lens 66, which collects laser light for reference light and generates reference light formed from a spherical reference wave, is disposed at the light transmitting side of the quarter-wave plate 78. The lens 66 irradiates P-polarized light as reference light onto the hologram recording medium 68.

It is preferable to use a lens of a small diameter and a short focal length as the lens 66. By using a lens having a short focal length, the small-diameter beam emitted from the laser oscillator 60 can be used as is without inserting an enlarging lens or the like.

A portion of the aforementioned reference light is transmitted through the hologram recording medium 68. A lens 70 which collimates the laser light which has passed through the hologram recording medium 68, a polarizing plate 72 through which P-polarized light is transmitted and which blocks S-polarized light, and a reflection-type spatial light modulator 74 which modulates laser light for signal light in accordance with a supplied recording signal of each page and generates the signal light (P-polarized light) for recording each page of the hologram, are provided at the light transmitting side of the hologram recording medium 68. Note that an intensity modulating element, such as an ND filter or the like, may be disposed between the lens 70 and the polarizing plate 72 in order to adjust the intensity ratio of the signal light and the reference light.

Lenses 80, 82, and a detector 84, which is structured by an image pickup element such as a CCD or the like and which converts received reconstruction light into an electric signal and outputs the electric signal, are disposed at the light reflecting side of the polarization beam splitter 64 at the reconstruction light reconstructed from the recording medium 68. The detector 84 is connected to a personal computer (not shown). The personal computer is connected to the spatial light modulator 74 via a pattern generator. Further, a driving device (not shown), which drives the shutter 62 and the quarter-wave plate 78 individually, is connected to the personal computer.

At the time of recording a hologram, first, the driving device (not shown) is driven, and the shutter 62 and the quarter-wave plate 78 are respectively withdrawn from the optical path such that the laser light can pass through. Next, the laser light is illuminated from the laser oscillator 60, a recording signal for each page is supplied from the personal computer (not shown) to the spatial light modulator 74 at a predetermined timing, and the hologram recording processing onto the hologram recording medium 68 is carried out.

Namely, the laser light (P-polarized light) emitted from the laser oscillator 60 is incident on the polarization beam splitter 64. The P-polarized light, which is transmitted through the polarization beam splitter 64, is collected at the lens 66, and reference light formed from a spherical reference wave is generated. The generated reference light of P-polarized light is illuminated onto the hologram recording medium 68. The laser light which is transmitted through the hologram recording medium 68 is collimated into a large-diameter beam at the lens 70, is transmitted through the polarizing plate 72, and is incident on the spatial light modulator 74 as laser light for signal light.

The incident laser light is modulated by the reflection-type spatial light modulator 74 in accordance with the supplied recording signal for each page, and signal light is generated. Among the light which is modulated at the reflection-type spatial light modulator 74, only the signal light of P-polarized light passes through the polarizing plate 72, is collected at the lens 70, and is illuminated onto the hologram recording medium 68 on the same axis as and from a side different than the reference light. Due to the signal light and the reference light being illuminated simultaneously onto the hologram recording medium 68 in this way, hologram recording of each page is carried out.

When the hologram is reconstructed, first, the driving device (not shown) is driven, and the quarter-wave plate 78 is inserted onto the optical path. In this way, the P-polarized light transmitted through the polarization beam splitter 64 is converted into circularly polarized light at the quarter-wave plate 78, is collected at the lens 66, and is illuminated onto the hologram recording medium 68. The reconstruction light diffracted at the hologram recording medium 68 becomes reverse-direction circularly polarized light, and emerges at the lens 66 side.

The reverse-direction circularly polarized light is transmitted through the lens 66, is converted into linearly polarized light at the quarter-wave plate 78, and is incident on the polarization beam splitter 64. Only the S-polarized light which is the reconstruction light is selectively reflected at the polarization beam splitter 64 and is received at the detector 84 via the lenses 80, 82, and the hologram image of each page is reconstructed.

As described above, in the second embodiment, in the same way as in the first embodiment, because the signal light and the reference light are illuminated onto the hologram recording medium on the same axis and from opposite directions, a reflection-type hologram can be recorded. In this reflection-type hologram, a hologram can be multiple-recorded by utilizing the direction of thickness of the recording medium, and high density recording can be achieved.

Further, in the second embodiment, because the reference light, which is transmitted through the hologram recording medium, is used as the light for the signal light, the loss of the light amount can be decreased. Further, the optical system for making the signal light and the reference light coaxial is simple, the device can be made more compact and lower-cost, and the failure rate can be reduced.

Figure 5:
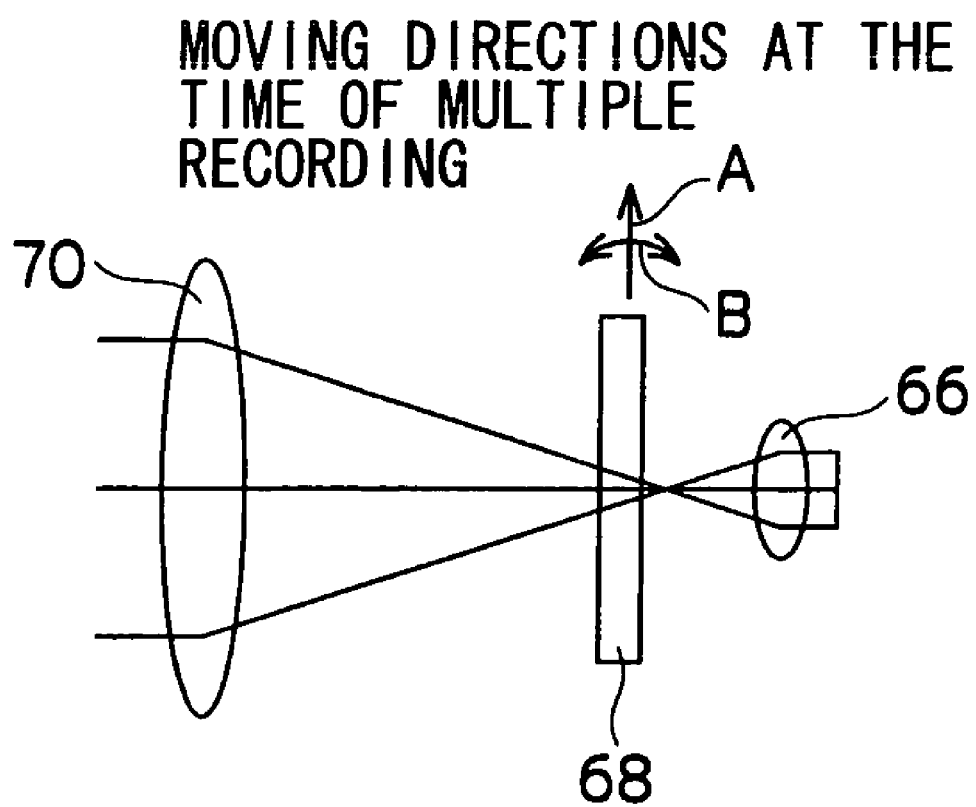
FIG. 5 is a diagram showing directions of moving a hologram recording medium.

Note that, in a case in which shift multiple recording is carried out, other than carrying out the multiple recording while rotating the hologram recording medium 68 around an axis of rotation which is parallel to the optical axis, as shown in FIG. 5, multiple recording may be carried out while moving the hologram recording medium 68 parallel to a direction along the main surface thereof (the direction of arrow A). Or, multiple recording may be carried out while rotating the hologram recording medium 68 in the direction of arrow B so that the optical axis and a normal line of the main surface of the hologram recording medium 68 intersect one another.

Figure 6:
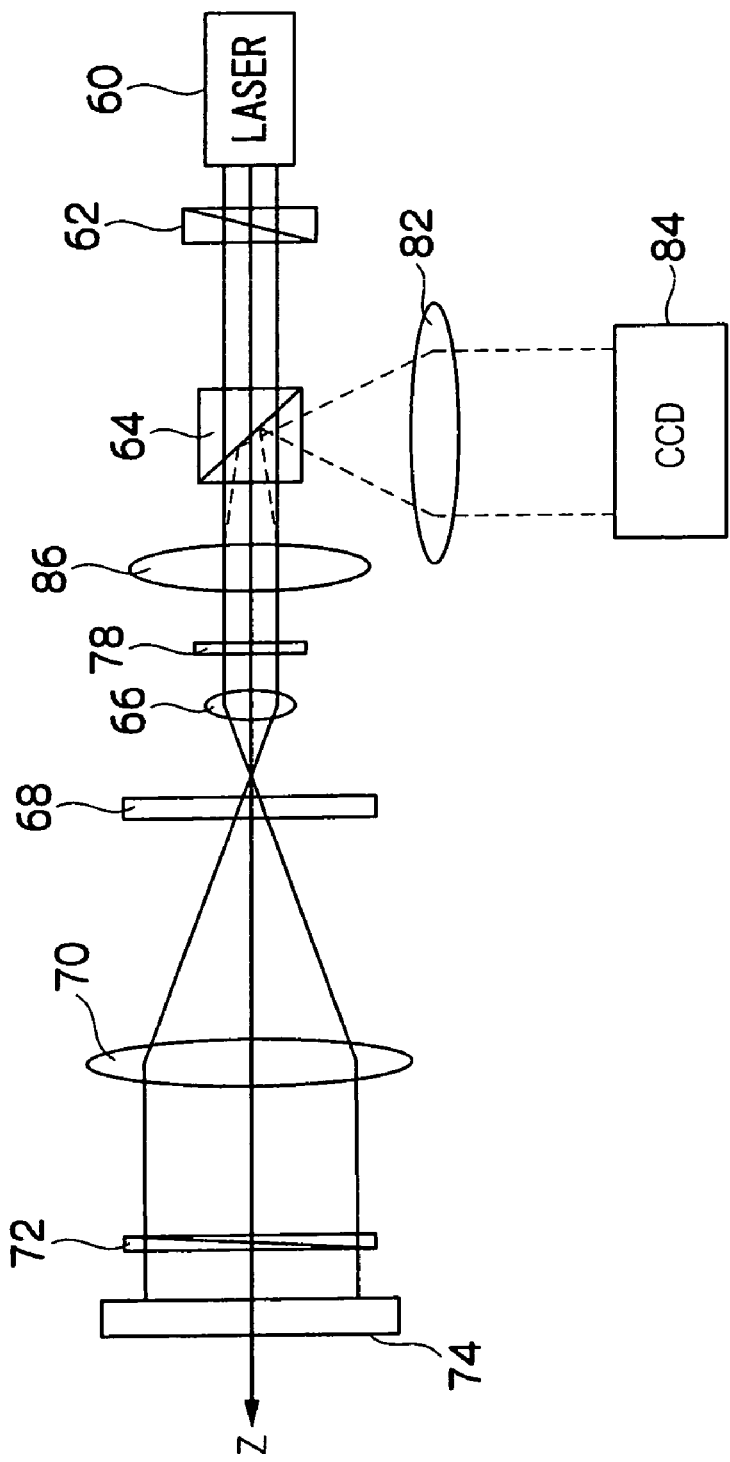
FIG. 6 is a diagram showing a modified example in which a long focal length lens is inserted.

Further, in the structure shown in FIG. 4, in a case in which a short focal length lens is used as the lens 66, the lens 66 and the polarization beam splitter 64 are too close to one another, and it is physically difficult to place the quarter-wave plate 78 between the lens 66 and the polarization beam splitter 64. In this case, as shown in FIG. 6, it is preferable to insert a long focal length lens 86 between the lens 66 and the polarization beam splitter 64.

When the collimated light, which has passed through the polarization beam splitter 64, is transmitted through the long focal length lens 86, the transmitted light is no longer strictly collimated light, but because the focal length of the lens 86 is long, it can be considered to be substantially collimated light. Accordingly, given that the focal length of the lens 66 is $f_3$ and the focal length of the lens 70 is $f_4$, by making the interval between the lens 66 and the lens 70 be $(f_3+f_4)$, the light which is transmitted through the lens 70 can be made to be substantially collimated light.

Further, in order to generate even more strict collimated light by the lens 70, it is preferable that the interval between the lens 66 and the lens 70 be made to be smaller than $(f_3+f_4)$. At the time of reconstructing, the reconstruction light which is generated from the recording medium 68 is Fourier transformed by the lens 66 and is imaged between the lens 66 and the lens 86, and that image is relayed by the lens 86 and the lens 82 and is incident on the detector 84. By inserting the long focal length lens 86, the distance between the lens 66 and the lens 86 can be made to be large, and it is easy to ensure a place for placement of the quarter-wave plate 78.

Figure 7:
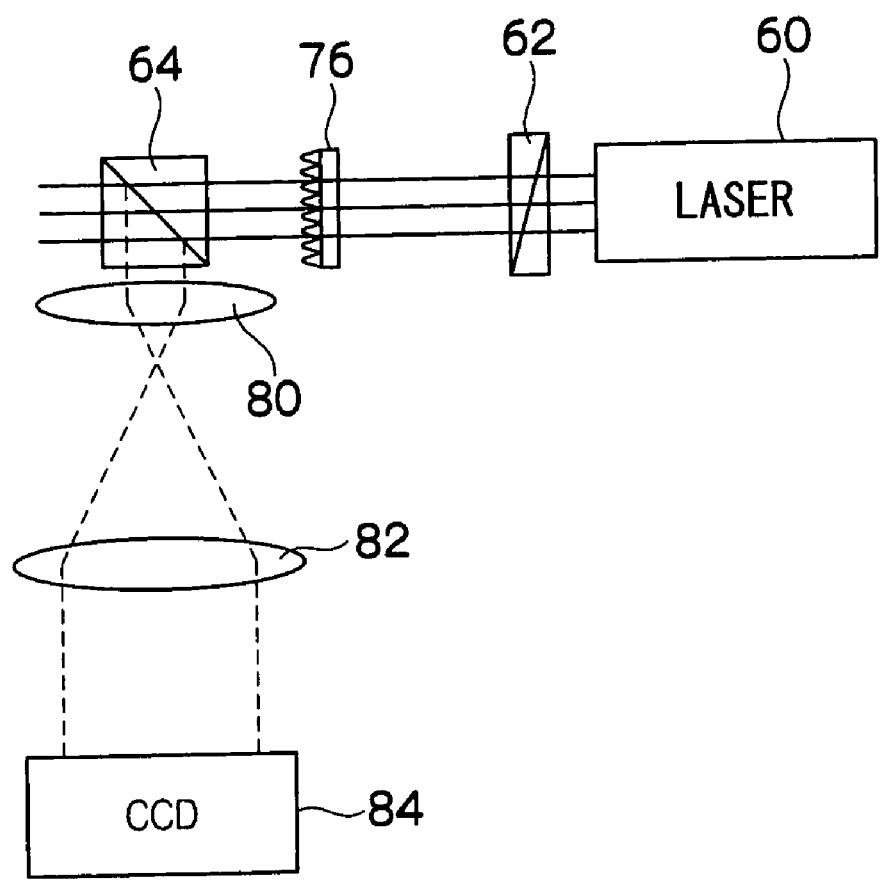
FIG. 7 is a diagram showing a modified example in which a diffraction element is inserted.

Moreover, as shown in FIG. 7, a diffraction element 76, such as a computer generated hologram (CGH) or the like, can be inserted between the laser oscillator 60 and the polarization beam splitter 64. Other than inserting the diffraction element 76, the structure is the same as that of the device shown in FIG. 4. By inserting the diffraction element 76, the hologram recording medium 68 is placed at the Fourier transform plane of the signal light, and a hologram can be recorded.

Third Embodiment

Figure 8:
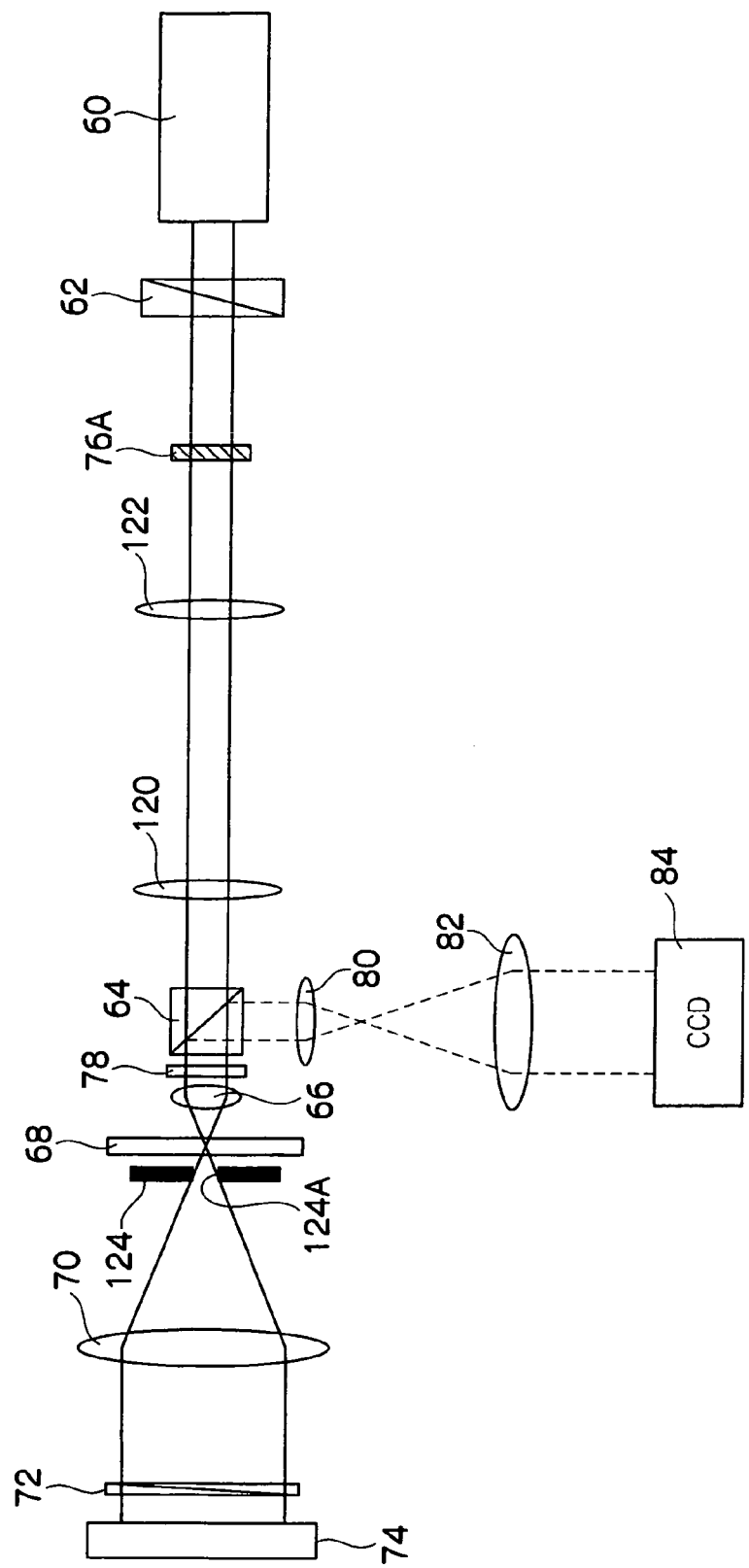
FIG. 8 is a schematic structural diagram of a hologram recording/reconstructing device relating to a third embodiment of the present invention.

FIG. 8 is a schematic structural diagram of a hologram recording/reconstructing device relating to a third embodiment of the present invention. As shown in FIG. 8, in this hologram recording/reconstructing device, a diffraction element 76A, which modulates the intensity distribution or the phase distribution of the incident light, and lenses 120, 122 are inserted between the laser oscillator 60 and the polarization beam splitter 64. Further, a light-shielding plate 124, in which an aperture 124A is formed, is disposed next to the hologram recording medium 68, at the signal light incident side of the hologram recording medium 68. Other than these points, the structure is the same as that of the hologram recording/reconstructing device shown in FIG. 4. Therefore, the same reference numerals are applied to the same structural portions, and description thereof will be omitted.

A computer generated hologram (CGH) or the like, which can design the pattern of the reference light at the Fourier transform plane which is the position of the hologram recording medium 68, can be used as the diffraction element 76A. A phase-modulating-type diffraction element is preferable as the diffraction element 76A. By using kinoform in particular, the loss of the amount of light can be reduced.

The lens 120 and the lens 122 enlarge or reduce, at a magnification m, the light obtained by the emitted light of the laser oscillator 60 being modulated by the diffraction element 76A, and relay it to a front focal plane of the lens 66. As will be described later, the relayed image is Fourier transformed by the lens 66, is illuminated onto the recording medium 68, interferes with the signal light, and records a hologram.

Here, the efficiency of utilization of the light can be improved by designing the pattern of the reference light such that only a specific frequency region of the signal light is illuminated at the reference light. For example, given that the pixel interval of the spatial light modulator 74 is $p_2$ and the focal length of the lens 70 is $f_4$, all of the spatial frequency components included in the signal light transmitted through the aperture 124A can be assumed to be within a square range which is in the Fourier transform plane and whose center is the optical axis and whose length of a side is less than or equal to $f_4/p_2$. In this case, if the maximum spatial frequency component included in the reference light is in a wider range which encompasses the aforementioned range, the signal light and the reference light are superposed at the Fourier transform plane, and a hologram can be recorded. To this end, given that the focal length of the lens 66 is $f_3$ and the pixel interval of the diffraction element 76A is q, it is preferable that $f_4/p_2 \leq f_3/(mq)$, and more preferable that $f_4/p_2 = f_3/(mq)$. Note that m is the enlargement magnification of the lens 120 and the lens 122.

Given that the focal length of the lens 70 is $f_4$, the pixel interval of the spatial light modulator 74 is $p_2$, and the wavelength of the laser light is $\lambda$, the size of the aperture 124A is preferably within the range of $1\lambda f_4/p_2$ to $2.5\lambda f_4/p_2$, and is more preferably within the range of $1\lambda f_4/p_2$ to $1.5\lambda f_4/p_2$.

Figure 9A:
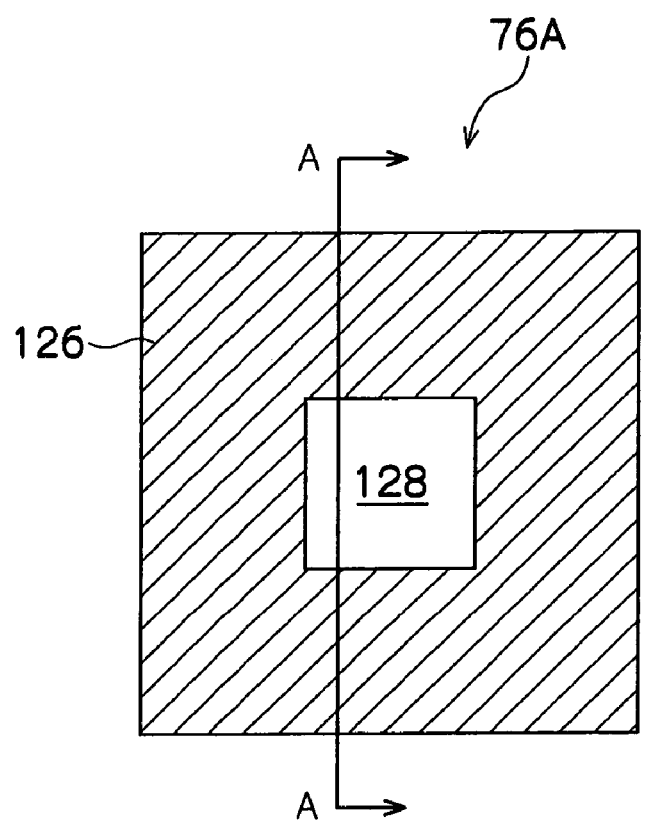
FIG. 9A is a front view showing the structure of a diffraction element used in the third embodiment.
Figure 9B:
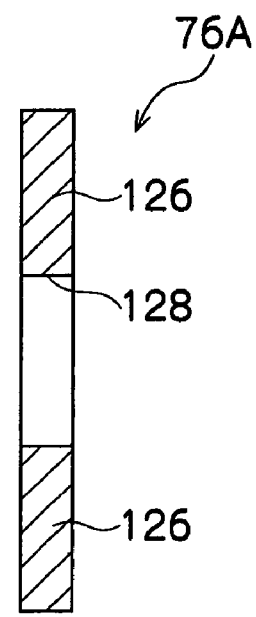
FIG. 9B is a cross-sectional view along arrow A-A of FIG. 9A.

The structure of the diffraction element 76A used in the present embodiment is shown in FIGS. 9A and 9B. This flat-plate-shaped diffraction element 76A is structured by a hollow region 128 which is punched-out in the form of a rectangle, and an outer frame region 126 surrounding the periphery thereof. The intensity distribution or the phase distribution of the incident light is modulated at the outer frame region 126, but is not modulated at the hollow region 128. Here, the rectangular hollow region 128 is a shape similar to the signal light pattern region at the reflection-type spatial light modulator 74. By designing the surface area of the hollow region 128 at the diffraction element 76A, it is possible to illuminate only collimated light on the reflection-type spatial light modulator 74. Signal light of good quality can thereby be obtained. Given that the surface area of the hollow region 128 is A, the magnification of the surface area enlarged by the lens 66 and the lens 70 is M, and the surface area of the region of the signal light pattern of the reflection-type spatial light modulator 74 is B, it is preferable that $A \geq B/M$, and more preferable that $A \geq 1.2B/M$. Another advantage resulting from designing the surface area A of the hollow region 128 is that the intensity balance of the signal light and the reference light can be adjusted.

At the time of recording a hologram, first, the driving device (not shown) is driven, and the shutter 62 and the quarter-wave plate 78 are respectively withdrawn from the optical path such that the laser light can pass through. Next, the laser light is illuminated from the laser oscillator 60, a recording signal for each page is supplied from the personal computer (not shown) to the spatial light modulator 74 at a predetermined timing, and the hologram recording processing onto the hologram recording medium 68 is carried out.

The laser light emitted from the laser oscillator 60 is incident on the diffraction element 76A. The incident laser light passes through the hollow region 128 of the diffraction element 76A as shown by the dashed line in FIG. 10. However, at the outer frame region 126, as shown by the solid line, the intensity or the phase is modulated to a predetermined pattern, and the light exits. The laser light which exits from the diffraction element 76A is transmitted through the lenses 122, 120, and is incident on the polarization beam splitter 64.

The P-polarized light transmitted through the polarization beam splitter 64 is collected at the lens 66, whose front focal plane is the rear focal plane of the lens 120. Reference light, which is formed from a diffraction pattern due to the intensity distribution or the phase distribution of the diffraction element 76A, is generated. The generated reference light of P-polarized light is illuminated onto the hologram recording medium 68. The laser light transmitted through the hologram recording medium 68, and in particular, the zeroth-order light passing through the hollow region 128 of the diffraction element 76A, is collimated into a large-diameter beam at the lens 70, passes through the polarizing plate 72, and is incident on the spatial light modulator 74 as laser light for signal light.

The incident laser light is modulated by the reflection-type spatial light modulator 74 in accordance with the supplied recording signal for each page, and signal light is generated. Among the light which is modulated at the reflection-type spatial light modulator 74, only the signal light of P-polarized light passes-through the polarizing plate 72, is collected at the lens 70, passes through the aperture 124A formed in the light-shielding plate 124, and is illuminated onto the hologram recording medium 68 on the same axis as and from a different side than the reference light. By simultaneously illuminating the signal light and the reference light onto the hologram recording medium 68 in this way, hologram recording of each page is carried out.

Because the method of reconstructing the hologram is similar to that of the second embodiment, description thereof will be omitted.

As described above, in the third embodiment, in the same way as in the first and second embodiments, a reflection-type hologram can be recorded, and high-density recording can be achieved by multiple recording of a hologram utilizing the direction of thickness of the recording medium. Moreover, in the same way as in the second embodiment, because the reference light, which is transmitted through the hologram recording medium, is used as the light for the signal light, the loss of the light amount can be decreased. Further, the optical system for making the signal light and the reference light coaxial is simple, the device can be made more compact and lower-cost, and the failure rate can be reduced.

Figure 10:
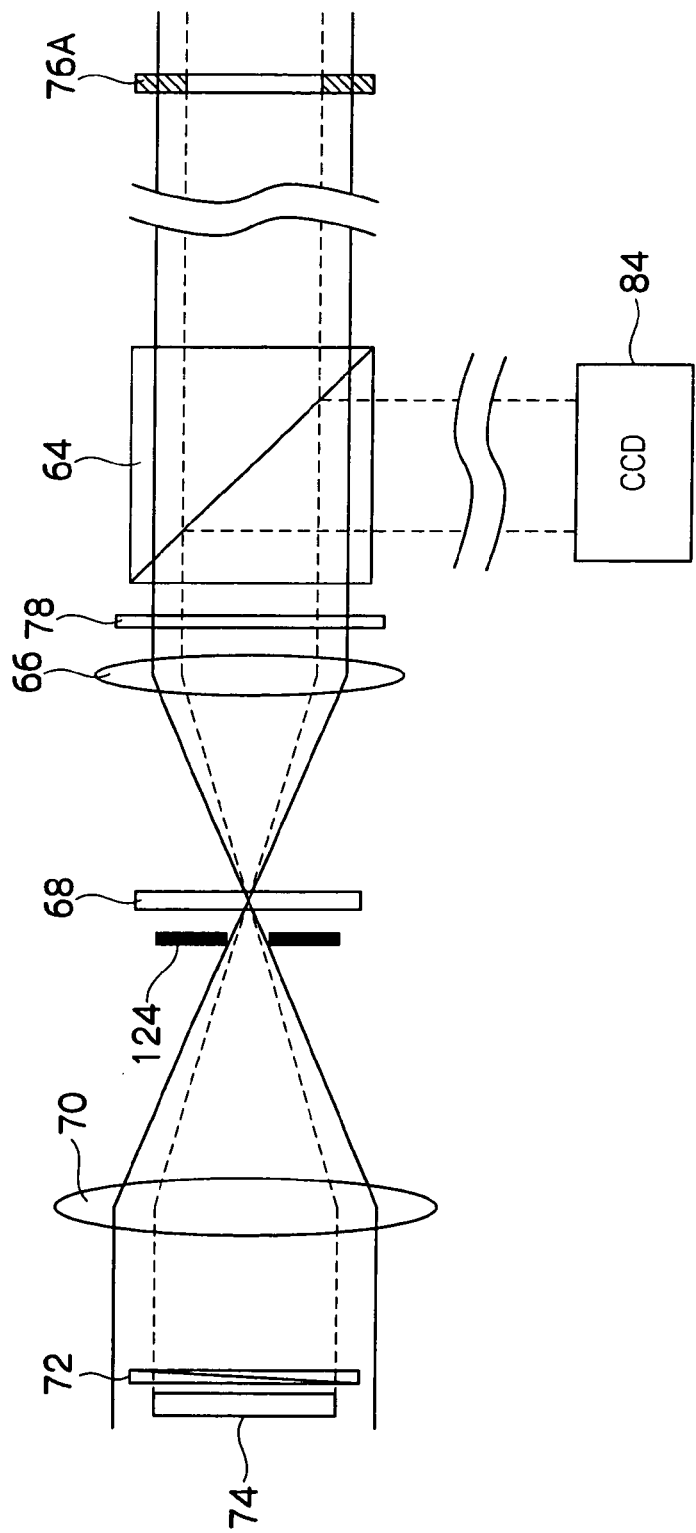
FIG. 10 is a diagram showing a state in which only light, which has passed through a hollow region of the diffraction element, is incident on a spatial light modulator.

In addition, in the third embodiment, by inserting the diffraction element, the region where the signal light and the reference light are superposed at the Fourier transform plane can be optimized, and therefore, a high light utilization efficiency can be realized. As a result, the time for recording the hologram can be shortened. Further, the size of the hollow region 128 or the size of the spatial light modulator 74 is adjusted, such that only the light (shown by the dashed line) which passes through the hollow region 128 of the diffraction element 76A is incident on the spatial light modulator 74 as shown in FIG. 10. In this way, light other than the light which passes through the hollow region 128 is not incident on the spatial light modulator 74. Accordingly, low-noise, high-quality signal light can be generated.

Fourth Embodiment

Figure 11:
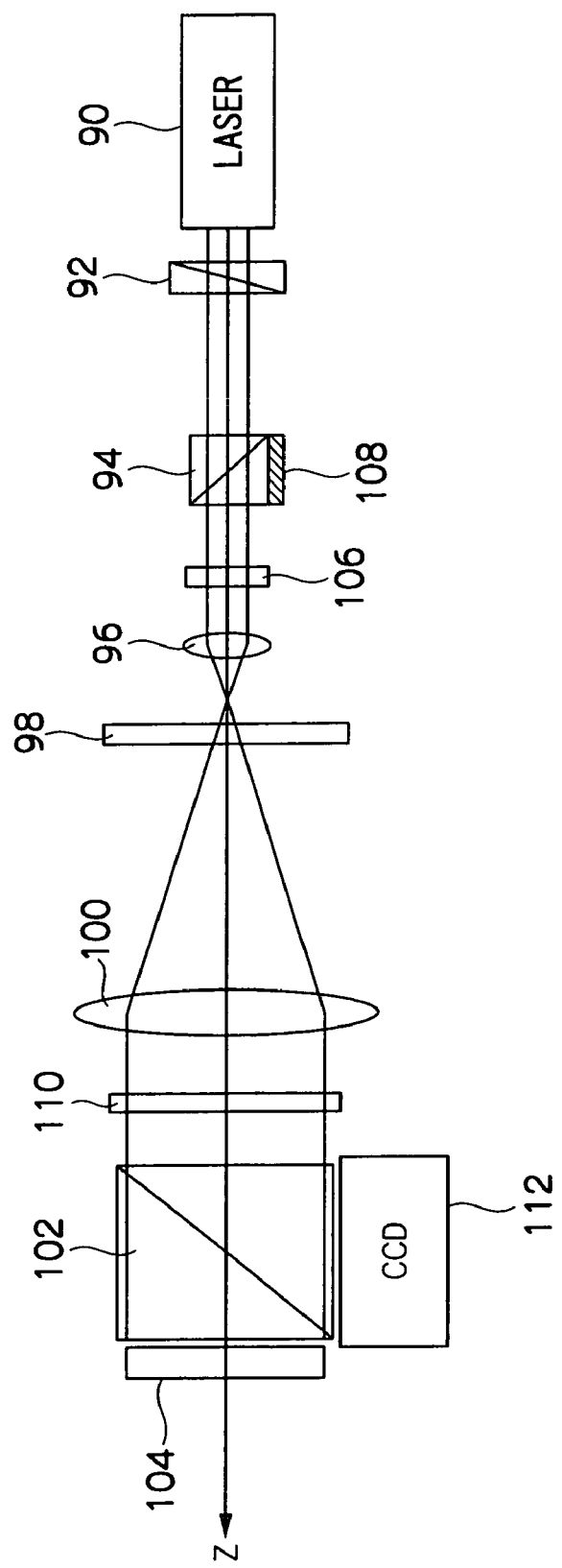
FIG. 11 is a schematic structural diagram of a hologram recording/reconstructing device relating to a fourth embodiment of the present invention.

FIG. 11 is a schematic structural diagram of a hologram recording/reconstructing device relating to a fourth embodiment of the present invention. As shown in FIG. 11, a laser oscillator 90 is provided at the hologram recording/reconstructing device. Laser light (P-polarized light) is oscillated and illuminated from the laser oscillator 90. A shutter 92, which is for blocking laser light, is disposed at the laser light illuminating side of the laser oscillator 90, so as to be able to withdraw from the optical path. A polarization beam splitter 94, which transmits P-polarized light and reflects S-polarized light, is disposed at the light transmitting side of the shutter 92.

A quarter-wave plate 106, which converts linearly polarized light into circularly polarized light or circularly polarized light into linearly polarized light, is disposed at the light transmitting side of the polarization beam splitter 94, so as to be able to withdraw from the optical path. A lens 96, which collects laser light for reference light and generates reference light which is formed from a spherical reference wave, is disposed at the light transmitting side of the quarter-wave plate 106. The lens 96 illuminates P-polarized light as reference light onto a hologram recording medium 98. A reflecting mirror 108 is disposed at the light reflecting side of the polarization beam splitter 94.

The aforementioned reference light passes through the hologram recording medium 98. A lens 100, which collimates the laser light which has passed through the hologram recording medium 98, and a polarization beam splitter 102 are disposed at the light transmitting side of the hologram recording medium 98. A quarter-wave plate 110 is disposed between the lens 100 and the polarization beam splitter 102, so as to be able to withdraw from the optical path. A reflection-type spatial light modulator 104, which modulates the laser light for signal light in accordance with a supplied recording signal of each page and generates signal light for recording each page of the hologram, is provided at the light transmitting side of the polarization beam splitter 102.

A detector 112, which is structured by an image pickup element such as a CCD or the like and which converts received reconstruction light into an electric signal and outputs the electric signal, is disposed at the light reflecting side of the polarization beam splitter 102. The detector 112 is connected to a personal computer (not shown). The personal computer is connected to the spatial light modulator 104 via a pattern generator. Further, a driving device (not shown), which drives the shutter 92 and the quarter-wave plates 106, 110 individually, is connected to the personal computer.

At the time of recording a hologram, first, the driving device (not shown) is driven, and the shutter 92 and the quarter-wave plates 106, 110 are respectively withdrawn from the optical path such that laser light can pass through. Next, the laser light is illuminated from the laser oscillator 90, a recording signal for each page is supplied from the personal computer (not shown) to the spatial light modulator 104 at predetermined timings, and hologram recording processing onto the hologram recording medium 98 is carried out.

Namely, the laser light emitted from the laser oscillator 90 is incident on the polarization beam splitter 94. The P-polarized light which passes through the polarization beam splitter 94 is collected at the lens 96, and reference light formed from a spherical reference wave is generated. The generated reference light of P-polarized light is illuminated onto the hologram recording medium 98. The laser light which is transmitted through the hologram recording medium 98 is collimated into a large-diameter beam at the lens 100, passes through the polarization beam splitter 102, and is incident on the spatial light modulator 104 as laser light for signal light.

The incident laser light is modulated by the reflection-type spatial light modulator 104 in accordance with the supplied recording signal of each page, and signal light is generated. Among the light which is modulated at the reflection-type spatial light modulator 104, only the signal light of P-polarized light is transmitted through the polarization beam splitter 102, is collected at the lens 100, and is illuminated on the hologram recording medium 98 on the same axis as and from a side different than the reference light. Due to the signal light and the reference light being illuminated onto the hologram recording medium 98 simultaneously in this way, hologram recording of each page is carried out.

Note that, at the time of recording the hologram, the polarization beam splitter 94 is not a requisite structural element. Therefore, the polarization beam splitter 94 may be withdrawn from the optical path at the time of recording a hologram, and may be inserted onto the optical path at the time of reconstructing a hologram.

At the time of reconstructing a hologram, first, the driving device (not shown) is driven, and the quarter-wave plates 106, 110 are inserted onto the optical path. In this way, the P-polarized light, which has passed through the polarization beam splitter 94, is converted into circularly polarized light at the quarter-wave plate 106, is collected at the lens 96, and is illuminated onto the hologram recording medium 98. The reconstruction light diffracted at the hologram recording medium 98 becomes reverse-direction circularly polarized light, and exits at the lens 96 side.

The reverse-direction circularly polarized light passes through the lens 96, is converted into linearly polarized light (S-polarized light) at the quarter-wave plate 106, and is incident on the polarization beam splitter 94. Only the S-polarized light which is the reconstruction light is selectively reflected at the polarization beam splitter 94 and is emergent. The light emerging from the polarization beam splitter 94 is reflected at the mirror 108, and is again incident on the polarization beam splitter 94. The polarized light of the reflected light from the mirror 108 is still S-polarized light. The reflected light of this S-polarized light is reflected at the polarization beam splitter 94 and exits.

The S-polarized light, which again exits from the polarization beam splitter 94, is converted into reverse-direction circularly polarized light at the quarter-wave plate 106, is collected at the lens 96, and is illuminated onto the hologram recording medium 98. The reconstruction light which is transmitted through the hologram recording medium 98 is collimated by the lens 100, is converted into linearly polarized light (S-polarized light) by the quarter-wave plate 110, and is incident on the polarization beam splitter 102. Only the S-polarized light which is the reconstruction light is selectively reflected at the polarization beam splitter 102 and is emergent. The emergent light is received at the detector 112, and the hologram image of each page is reconstructed.

As described above, in the fourth embodiment, in the same way as in the first and second embodiments, a reflection-type hologram can be recorded, and high-density recording can be achieved by multiple recording of a hologram utilizing the direction of thickness of the recording medium. Moreover, in the same way as in the second embodiment, because the reference light, which is transmitted through the hologram recording medium, is used as the light for the signal light, the loss of the light amount can be decreased. Further, the optical system for making the signal light and the reference light coaxial is simple, the device can be made more compact and lower-cost, and the failure rate can be reduced.

In addition, in the fourth embodiment, due to phase conjugation, the effects of strain, which is generated at each optical element, on the reconstruction light can be made to be small. Therefore, the bit error rate can be made to be small.

In the above explanation, the polarization beam splitter 102 is disposed in a vicinity of the reflection-type spatial light modulator 104. However, in a case in which a polarization hologram is recorded in and reconstructed from a medium at which polarized light recording is possible, the polarization beam splitter 102 can be omitted. In this case, at the time of reconstructing, the detector 112 is disposed in place of the reflection-type spatial light modulator 104. There is also no need to insert the quarter-wave plates 106, 110.

In the above second and third embodiments, description is given of a method of recording and reconstructing a hologram in accordance with intensity modulation. A case of using a medium at which polarized light recording is possible in the second in third embodiments will be described hereinafter. For example, in FIG. 4 or FIG. 8, in the case of using a medium at which polarized light recording is possible as the hologram recording medium 68, the transmission axis is set such that the polarizing plate 72 transmits S-polarized light and blocks P-polarized light. In this way, a polarization hologram can be recorded in the hologram recording medium 68 by signal light of S-polarized light and reference light of P-polarized light.

At the time of reconstructing, there is no need to insert the quarter-wave plate 78. When the P-polarized light of the reading light is illuminated onto the polarization hologram recorded in the hologram recording medium 68, the reconstruction light of S-polarized light exits in the direction of the polarization beam splitter 64, is reflected by the polarization beam splitter 64, and is detected at the detector 84. In this case, the noise of the P-polarized light which is caused by the scattering of the reading light is transmitted through the polarization beam splitter 64 and is not incident on the detector 84, because the plane of polarization thereof is orthogonal to that of the reconstruction light of S-polarized light. Accordingly, the SN ratio of the reconstructed image detected at the detector 84 can be made to be large.

Adjustment of the intensity ratio of the signal light and the reference light can also be carried out by disposing an intensity modulating element such as an ND filter at an arbitrary position between the hologram recording medium 68 and the spatial light modulator 74. The intensity modulating element is preferably disposed between the polarizing plate 72 and the spatial light modulator 74. Note that, in the fourth embodiment as well, adjustment of the intensity ratio of the signal light and the reference light can be carried out by disposing an intensity modulating element such as an ND filter between the polarization beam splitter 102 and the spatial light modulator 104.

What is claimed is:

1. A hologram recording/reconstructing method for recording information of signal light as a reflection-type hologram on an optical recording medium and reconstructing the recorded information, the method comprising:
    emitting a laser light;
    generating, from the emitted laser light, a signal light and a reference light during the time of recording the information, and the reference light during the time of reconstructing the recorded information, the signal light and the reference light being linearly polarized lights;
    providing a half-wave plate to change the electric field oscillation direction of a light to make the electric field oscillation directions of polarization the same for the signal light and the reference light during the time of recording the information; and
    illuminating, during the time of recording the information, the signal light and the reference light as a recording light on a same axis from opposite surface sides of the optical recording medium, and illuminating, during the time of reconstructing the recorded information, the reference light as a reading light,
    wherein the method further comprises positioning a single quarter wave plate on an optical path of the reference light during the time of reconstructing the recorded information, and positioning the single quarter wave plate away from the optical path during the time of recording the information.

2. The hologram recording/reconstructing method of claim 1, further comprising generating the signal light by modulating reference light which has been transmitted through the optical recording medium.

3. The hologram recording/reconstructing method of claim 2, further comprising modulating, by a spatial light modulator, the reference light which has been transmitted through the optical recording medium.

4. The hologram recording/reconstructing method of claim 3, wherein the spatial light modulator is a reflection-type spatial light modulator.

5. The hologram recording/reconstructing method of claim 4, further comprising:
    generating signal light by modulating, by the spatial light modulator, the reference light which has been transmitted through the optical recording medium;
    reflecting the generated signal light at an optical recording medium side; and
    illuminating the signal light and reference light on a same axis and from different sides of the optical recording medium.

6. The hologram recording/reconstructing method of claim 2, further comprising generating the signal light by modulating zeroth-order light included in the reference light which has been transmitted through the optical recording medium.

7. The hologram recording/reconstructing method of claim 2, further comprising illuminating, onto the optical recording medium, reference light whose intensity distribution or phase distribution has been modulated.

8. The hologram recording/reconstructing method of claim 7, wherein the reference light, whose intensity distribution or phase distribution has been modulated, is generated such that an intensity ratio of the signal light and the reference light is a predetermined value.

9. The hologram recording/reconstructing method of claim 7, wherein the reference light is generated by using a computer generated hologram.

10. The hologram recording/reconstructing method of claim 2, further comprising further modulating an intensity distribution or a phase distribution of the reference light such that an intensity ratio of the signal light and the reference light is a predetermined value, and illuminating the signal light and the reference light onto the optical recording medium.

11. The hologram recording/reconstructing method of claim 2, wherein, at a Fourier transform plane of the signal light, a region of first-order diffracted light due to a maximum spatial frequency included in a reference light pattern, encompasses a region of first-order diffracted light due to a maximum spatial frequency included in a signal light pattern.

12. The hologram recording/reconstructing method of claim 2, wherein, at a Fourier transform plane of the signal light, a region of first-order diffracted light due to a maximum spatial frequency included in a signal light pattern, and a region of first-order diffracted light due to a maximum spatial frequency included in a reference light pattern, are equal.

13. The hologram recording/reconstructing method of claim 1, further comprising disposing the optical recording medium at a Fourier transform plane of the signal light.

14. The hologram recording/reconstructing method of claim 1, further comprising disposing the optical recording medium at a position which is offset, in an optical axis direction, from a Fourier transform plane of the reference light.

15. The hologram recording/reconstructing method of claim 1, further comprising, in a case in which a position of a light-collecting point of the signal light and a position of a light-collecting point of the reference light are different, disposing the optical recording medium at a position other than the position of the light-collecting point of the signal light and the position of the light-collecting point of the reference light.

16. The hologram recording/reconstructing method of claim 1, the method further comprising:

emitting a reconstructing laser light for reconstructing, which is linearly polarized;
transmitting the reconstructing laser light through a polarization beam splitter;
illuminating the reconstructing laser light through a quarter-wave plate onto the optical recording medium to obtain a diffracted light;
transmitting the diffracted light through the quarter-wave plate;
reflecting the diffracted light by the polarization beam splitter; and
detecting the reflected light by a detector.

17. A hologram recording/reconstructing device comprising:
a laser light source emitting a laser light;
a signal light generating section that generates a signal light which is linearly polarized;
a reference light generating section that generates a reference light which is linearly polarized, wherein the electric field oscillation directions of polarization are the same for the signal light and the reference light when the device is recording the information;
a signal light illuminating section that illuminates the signal light onto an optical recording medium when the device is recording the information;
a reference light illuminating section that illuminates the reference light of a same axis as the signal light, onto the optical recording medium from a different side than the signal light when the device is recording the information and reconstructing the recorded information; and
a single quarter wave plate being positioned on an optical path of the reference light when the device is reconstructing the recorded information, and being positioned away from the optical path when the device is recording.

18. The hologram recording/reconstructing device of claim 17, wherein:
the reference light illuminating section is structured by an illuminating optical system which illuminates the laser light, which is emitted from the laser light source, from one surface side of the optical recording medium; and
the signal light illuminating section is structured by a spatial light modulator, which generates signal light by spatially modulating reference light transmitted through the optical recording medium, and an illuminating optical system, which illuminates the signal light, which is generated by the spatial light modulator, on a same axis as the reference light and from another surface side of the optical recording medium.

19. The hologram recording/reconstructing device of claim 18, wherein
the illuminating optical system of the signal light illuminating section includes a first lens whose focal length is fs and which collects the signal light on the optical recording medium, and the illuminating optical system of the reference light illuminating section includes a second lens whose focal length is ft and which collects the reference light on the optical recording medium, and
the first lens and the second lens are disposed such that a distance between the first lens and the second lens is different than a sum (fs+fr) of the focal lengths of the both lenses.

20. The hologram recording/reconstructing device of claim 17, wherein
the illuminating optical system of the signal light illuminating section includes a first lens whose focal length is fs and which collects the signal light on the optical recording medium, and the illuminating optical system of the reference light illuminating section includes a second lens whose focal length is fr and which collects the reference light on the optical recording medium, and
the first lens and the second lens are disposed such that a distance between the first lens and the second lens is different than a sum (fs+fr) of the focal lengths of the both lenses.

21. The hologram recording/reconstructing device of claim 17, further comprising:
a shutter selectively emitting a reconstructing laser light for reconstructing, which is linearly polarized;
a polarization beam splitter and a quarter-wave plate provided, in this order from the light source to the optical recording medium, on an optical path, which is common to both of an optical path of the reconstructing laser light from the light source to the optical recording medium and an optical path of an diffracted light diffracted by the optical recording medium, the polarization beam splitter transmitting the reconstructing laser light emitted by the light source and reflecting the diffracted light diffracted by the optical recording medium; and
a detector detecting the diffracted light reflected by the polarization beam splitter.

* * * * *